United States Patent
Watanabe et al.

(10) Patent No.: US 7,819,999 B2
(45) Date of Patent: Oct. 26, 2010

(54) METHOD AND DEVICE FOR MANUFACTURING DOUBLE-GLAZING PANEL WITH GLAZING GASKET

(75) Inventors: Jiro Watanabe, Hiratsuka (JP); Yuuji Kawamori, Hiratsuka (JP); Kazuo Arakawa, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 753 days.

(21) Appl. No.: 11/663,683

(22) PCT Filed: Aug. 30, 2005

(86) PCT No.: PCT/JP2005/015735
§ 371 (c)(1),
(2), (4) Date: Mar. 23, 2007

(87) PCT Pub. No.: WO2006/046349
PCT Pub. Date: May 4, 2006

(65) Prior Publication Data
US 2008/0115451 A1    May 22, 2008

(30) Foreign Application Priority Data
Oct. 27, 2004    (JP) .............................. 2004-312404

(51) Int. Cl.
*B29C 47/00* (2006.01)
(52) U.S. Cl. ................ 156/107; 156/108; 156/109; 156/244.11; 264/250; 264/252; 264/297.2; 296/93; 425/192 R; 425/111; 425/112; 425/394

(58) Field of Classification Search ............. 156/99, 156/107, 109, 244.11, 244.24, 108; 264/250, 264/252, 645, 297.2; 296/93; 249/162; 425/192 R, 425/111, 112, 394; 52/204.5, 204.593, 204.595, 52/204.597
See application file for complete search history.

(56) References Cited

U.S. PATENT DOCUMENTS

| 2002/0108694 A1* | 8/2002 | Okino et al. ............... 156/103 |
| 2004/0159057 A1* | 8/2004 | Hornung .................. 52/204.5 |

FOREIGN PATENT DOCUMENTS

| JP | 8-67537 | 3/1966 |
| JP | 4-275953 | 10/1992 |
| JP | 7-291678 | 11/1995 |
| JP | 07291678 A * | 11/1995 |
| JP | 8-118448 | 5/1996 |
| JP | 8-151238 | 6/1996 |
| JP | 9-291766 | 11/1997 |
| JP | 09291766 A * | 11/1997 |

OTHER PUBLICATIONS

Machine Translation of JP 09-291766.*

* cited by examiner

*Primary Examiner*—Richard Crispino
*Assistant Examiner*—Christopher Schatz
(74) *Attorney, Agent, or Firm*—Greer, Burns & Crain, Ltd

(57) ABSTRACT

A method and a device for directly molding a glazing gasket by extruding a molding material from a molding die to a peripheral edge part of a double-glazing panel in which a space layer is formed between two adjacent glass sheets with a spacer interposed in between. The molding die is configured of a front die and a rear die, which are independent of each other. The front die is allowed to adhere closely to at least the front surface of the double-glazing panel, and the rear die is allowed to adhere closely to at least the rear surface of the double-glazing panel, thereby molding the glazing gasket.

8 Claims, 5 Drawing Sheets

METHOD AND DEVICE FOR MANUFACTURING DOUBLE-GLAZING PANEL WITH GLAZING GASKET

TECHNICAL FIELD

The present invention relates to a method and a device for manufacturing a double-glazing panel with a glazing gasket, more specifically, to a method and a device for manufacturing a double-glazing panel with a glazing gasket, which allow formation of a glazing gasket with the excellent dimensional accuracy in a case where the glazing gasket is directly formed on a double-glazing panel by use of a molding die.

BACKGROUND ART

A double-glazing panel is a glass panel in which a space layer is formed with a spacer interposed between two glass sheets, thereby being filled with the air. Such a double-glazing panel including a space layer has an excellent heat insulating property, and therefore makes a great contribution to energy saving by being installed and used in a sash of a house or a building.

FIG. 7 is a cross-sectional view showing an essential part of a double-glazing panel 2 installed in a sash 100 as described above. In the double-glazing panel 2, a spacer 3 is interposed between two glass sheets 2a and 2b, and thereby a space layer 4 is formed therebetween. Each of glazing gaskets G made of polyvinyl chloride resin or the like is formed on the surfaces on a peripheral edge portion of this double-glazing panel 2, and the double-glazing panel 2 is installed in the sash 100 with this glazing gaskets G interposed in between. Thus, the inside of the double-glazing panel 2 is sealed to protect from rainwater and the like As described above, a double-glazing panel is installed in a sash after glazing gaskets are attached to the surfaces of the peripheral edge part thereof. Conventionally, the glazing gaskets are attached to the double-glazing panel by manually fitting gasket members which have been molded in a channel shape in advance. However, in recent years, a manufacturing method is proposed for forming a glazing gasket by directly extruding a molding material to a peripheral edge part of a double-glazing panel by use of a molding die.

Patent Document 1 discloses means shown in FIG. 8 as a method of directly molding a glazing gasket on a peripheral edge part of a double-glazing panel.

A molding die 105 of this means is formed as a unit so that the molding die 105 would surrounds from the front side to the rear side of a double-glazing panel 2. A slide die 106 facing the front surface of the double-glazing panel 2 and a slide die 106 facing the rear surface thereof are housed in this molding die 105 having one-unit structure. The slide dies 106 and 106 are slidable in front-to-rear directions by use of cylinders 107 and 107, respectively. Glazing gaskets G and G are directly formed by extruding a fused molding material from ejection ports 106a and 106a of the slide dies 106 and 106 onto the surfaces of the double-glazing panel 2.

Meanwhile, the double-glazing panel 2 has a structure in which two glass sheets 2a and 2b are stacked with a spacer 3 interposed in between. Accordingly, parallelism between the two glass sheets 2a and 2b inevitably has an inclination more or less due to a manufacturing error. For this reason, the molding die 105 is one-unit structure surrounding from the front surface to the rear surface of the double-glazing panel 2, any one of the two slide dies 106 and 106, which are movable only in the front-to-rear directions inside of the molding die 105, cannot adhere closely to the inclined surface of the double-glazing panel 2.

The slide die 106 that cannot adhere closely thereto is separated by a gap from the surface of the double-glazing panel 2. This results in a leakage of a fused molding material from the gap or a thickness deviation, thereby deteriorating the dimensional accuracy of a glazing gasket G after molding. If the double-glazing panel 2, to which the glazing gasket G having the thus deteriorated dimensional accuracy is attached, is installed in the sash 100, it is inevitable that the sealing property of the installed portion becomes incomplete.

In addition, in the conventional method of directly molding the glazing gaskets shown in FIG. 8, the molding is carried out by setting the double-glazing panel 2 to be horizontal. Therefore, a glazing gasket molded on the upper surface of the double-glazing panel 2 and a glazing gasket molded on a lower surface thereof are apt to have different cross-sectional shapes from each other due to a difference in the influence of the gravity. This is also one of the factors deteriorating the dimensional accuracy of the glazing gaskets. Patent Document 1: Japanese Patent No. 3135841

DISCLOSURE OF THE INVENTION

A principal object of the present invention is to provide a method and a device for manufacturing a double-glazing panel with a glazing gasket. By using the method and the device, in a case where the glazing gasket is directly molded by extruding a fused molding material from a molding die onto a surface of the double-glazing panel, the glazing gasket with the excellent dimensional accuracy can be molded without an occurrence of a leakage of a molding material or a thickness deviation therein.

Another object of the present invention is to provide a method and a device for manufacturing a double-glazing panel with a glazing gasket, which are capable of reducing an influence of the gravity to the dimensional accuracy of the glazing gaskets to be molded on both of front and rear sides of the double-glazing panel.

In order to attain the above-mentioned principal object, employed is a method of manufacturing a double-glazing panel with a glazing gasket according to the present invention in which a glazing gasket is directly molded by extruding a molding material from a molding die to a peripheral edge part of the double-glazing panel which includes at least two glass sheets and in which a space layer is formed between the adjacent glass sheets with a spacer interposed in between. Moreover, the method of manufacturing a double-glazing panel with a glazing gasket is characterized in that the molding die is configured of a front die and a rear die which are independent of each other, that the gasket is mold by allowing the front die to adhere closely to at least a front surface of the double-glazing panel, and by allowing the rear die to adhere closely to at least a rear surface of the double-glazing panel.

A device for manufacturing a double-glazing panel with a glazing gasket according to the present invention is a device of directly molding a glazing gasket by extruding a molding material from a molding die on a peripheral edge part of the double-glazing panel which includes at least two glass sheets, and in which a space layer is formed between the adjacent glass panels with a spacer interposed in between. The device for manufacturing a double-glazing panel with a glazing gasket is characterized in that the molding die is configured of a front die and a rear die, which are independent of each other, that the front die is disposed to adhere closely to at least a front surface of the double-glazing panel, and that the rear die is disposed to adhere closely to at least a rear surface of the double-glazing panel.

According to the present invention, the molding die is configured of the front die on the front surface of the double-glazing panel and the rear die on the rear surface thereof, which are independent of each other. Thus, the front die and the rear die can independently adhere closely to at least the front surface and the rear surface of the double-glazing panel, respectively. Accordingly, this configuration avoids forming a gap between the surface of the double-glazing panel, and the front die and the rear die, even if there is an inclination in parallelism between the front surface and the rear surface of the double-glazing panel. With this configuration, the glazing gasket having the excellent dimensional accuracy can be molded without causing a leakage of the molding material or a thickness deviation therein.

The other object of the present invention can be achieved if the double-glazing panel is set upright in a vertical direction in the operation of molding the glazing gasket. Specifically, by setting the double-glazing panel upright in the vertical direction, the gravity acts substantially evenly on the molding material ejected onto both of the front side and the rear side of the double-glazing panel. This results in the reduction in dimensional errors between the glazing gaskets to be molded on both sides of the double-glazing panel.

BEST MODES FOR CARRYING OUT THE INVENTION

Figure 1:
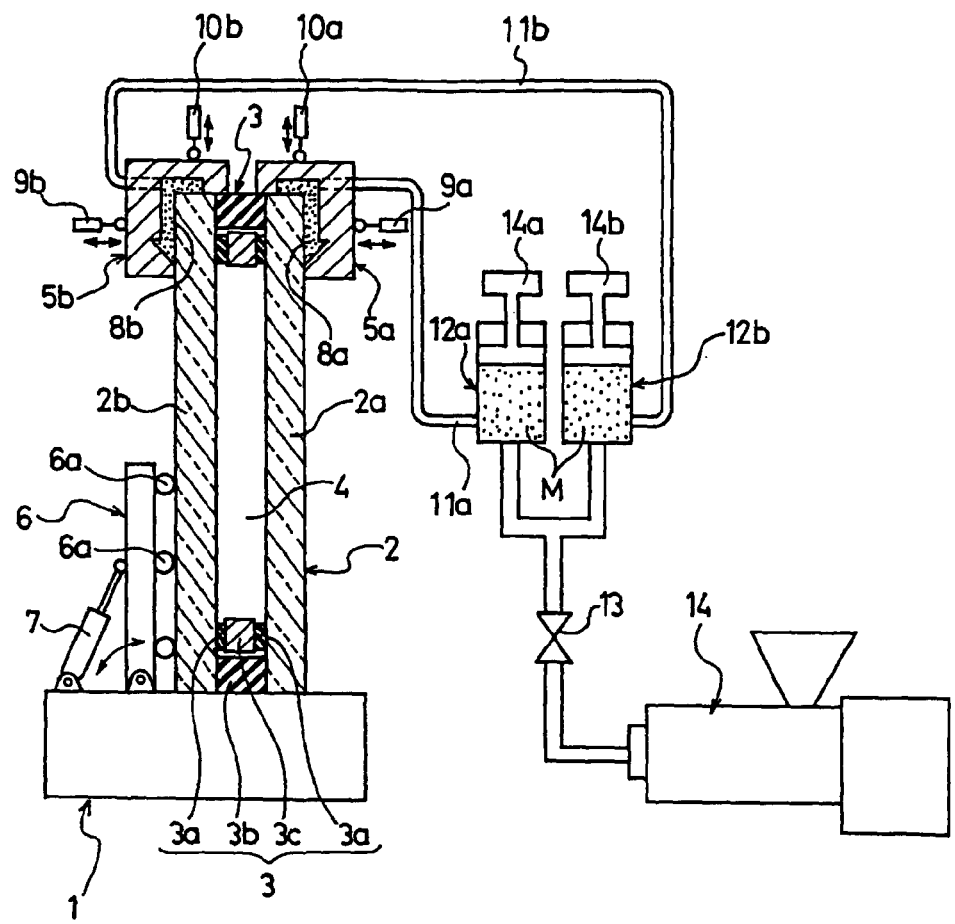
FIG. 1 is a schematic diagram of a device for carrying out a method of manufacturing a double-glazing panel with a glazing gasket of the present invention.

The type of double-glazing panel to which the present invention is applied is not particularly limited as long as a double-glazing panel includes at least two glass sheets, and has a structure in which a space layer is formed between the glass sheets with a spacer interposed in between. Specifically, as a typical double-glazing panel, a panel configured of two glass sheets is used, whereas there are also panels configured of three or more glass sheets. The present invention can be also applied to these panels.

Glazing gaskets are formed at least on a front surface and a rear surface of a peripheral edge part of a double-glazing panel. Here, it is also possible to extend the glazing gasket to cover a part of the end surface of the panel. A molding die for directly forming such glazing gaskets is configured of a front die and a rear die. The front die is to be disposed on the front surface of the double-glazing panel, and the rear die is to be disposed on the rear surface side of the double-glazing panel. In addition, the molding die is used in a configuration in which the front die and the rear die are independently separated from each other.

By employing the configuration in which the front die and the rear die are independent of each other, the front die and the rear die independently adhere closely to the front surface and the rear surface of the double-glazing panel, respectively. Thus, even when there is an inclination in parallelism between the front surface and the rear surface of the double-glazing panel, the front die and the rear die do not form any gap respectively with the surfaces of the double-glazing panel. This results in the avoidance of a leakage of a molding material or a thickness deviation therein. Accordingly, it is possible to mold the glazing gasket having the excellent dimensional accuracy.

As means for allowing the front die and the rear die to respectively adhere closely to the front surface and the rear surface of the double-glazing panel, it is possible to use pressurizing means, such as an air cylinder, a hydraulic cylinder or a spring, for applying an elastic force.

In a case where glazing gaskets each having a L-shaped cross section are molded so that the glazing gaskets would cover parts of the end surface together with the surfaces of the double-glazing panel, each of the ejection ports of the front die and the rear die is formed to have a cross section of a L-shape so that the ejection ports cover both of the surface and the end surface of the double-glazing panel at the same time. When the ejection ports of the front die and the rear die are formed to have the cross section of the L-shape, the ejection ports should adhere closely not only to the front surface and the rear surface of the double-glazing panel but also to the end surface thereof.

By allowing the front die and the rear die to adhere closely to the end surface side of the double-glazing panel as described above, it is possible to mold a glazing gasket having the excellent dimensional accuracy. This is because a leakage of a molding material or a thickness deviation therein does not occur, when there is a difference in the length between protruded portions of the adjacent glass sheets.

As an operation for directly molding the glazing gasket by use of the molding die, it is only necessary to eject the molding material from the molding die, while the molding die and the double-glazing panel are being moved relatively. As a method of causing the relative movement, the double-glazing glass may be fixed to a certain position, and the molding die may be moved along the peripheral edge part of the double-glazing panel. Alternatively, the molding die may be fixed to a certain position, and the double-glazing panel may be moved. In a case where the glazing gaskets are directly molded with the molding die with the double-glazing panel set upright in a vertical direction, it is also possible to combine an operation of moving the molding die for molding in the vertical direction and an operation of moving the double-glazing panel for molding in a horizontal direction. The operations of moving the molding die and/or the double-glazing panel may be carried out either manually or automatically by use of an industrial robot which can control the move in three-dimension.

The above-described molding operations are preferably performed with the double-glazing panel set upright in the vertical direction. By setting the double-glazing panel upright in the vertical direction, it is possible to substantially equalize actions of the gravity on the molding material ejected from the front die and the rear die onto the double-glazing panel. This makes it possible to reduce a dimensional error between the glazing gasket molded on the front surface and the glazing gasket molded on the rear surface of the double-glazing panel, and thereby to improve the dimensional accuracy.

In a case where the double-glazing panel is set upright in the vertical direction, an angle to the vertical direction (the direction of the gravity) is set preferably within a range from 0° to 45°, or more preferably within a range from 0° to 15°. If the angle exceeds 45°, a dimensional error occurs between the glazing gasket on the front surface and the glazing gasket on the rear surface of the double-glazing panel, due to a difference between the actions of the gravity thereon.

Almost all of the influence of the gravity can be eliminated by setting the angle of the double-glazing panel equal to 0°. However, if the double-glazing panel is set perfectly vertical, it is unpredictable in which of falling directions, the front-side direction and the rear-side direction, the double-glazing panel falls due to an earthquake or the like. This causes a safety management problem in a shop floor.

In consideration of a safety measure in the shop floor, the double-glazing panel should be slightly inclined to a non-operational side from the vertical direction. The angle of inclination to the non-operational side is set preferably within a range from 2° to 10°, or more preferably within a range from 3° to 7° to the vertical direction. By inclining the double-glazing panel to the non-operational side by 2° or greater as is described above, it is possible to cause the double-glazing panel to fall toward the non-operational side without fail, and thus to ensure the safety of operators in the shop floor. Moreover, by setting the angle of inclination of the double-glazing panel equal to or below 10°, it is possible to reduce a dimensional difference between the glazing gaskets molded respectively on the front and rear surface sides of the double-glazing panel.

The glazing gasket may be molded by extruding the fused molding material directly onto the double-glazing panel. However, if the glazing gasket is molded on the double-gazing panel with an adhesive interposed in between, peel resistance can be further improved. In a case where the adhesive is interposed, as described above, the adhesive may be extruded simultaneously on the molding material, which is to be extruded from the front die and the rear die, on the sides each facing the double-glazing panel.

A molding material used in the present invention is not particularly limited, as long as the material allows fusion molding and has elasticity when it is hardened. A typical material may be a thermoplastic elastomer. Specific examples of the thermoplastic elastomer include an elastomer resin of a polyvinyl chloride series, olefin-type, polyamide series, polyester series, silicone series, fluorocarbon series, urethane series, and the like. Among them, a thermoplastic elastomer called thermo plastic vulcanizates (TPV) made of thermoplastic resin containing vulcanized rubber is particularly preferable due to a small amount of permanent compression set and excellent long-term durability. Alternatively, soft resin having the JIS-A hardness of 85 or less, such as polyvinyl chloride series resin, can be used as the thermoplastic resin.

Meanwhile, as for the adhesive, it is preferable to use a hot melt adhesive which can be applied in the melt condition. Such a hot melt adhesive may be the one essentially containing any one of butyl rubber, ethylene-propylene rubber, styrene series block copolymer, amorphous polyolefin, polyisobutylene, polyester or the like.

FIG. 1 shows an outline of a device carrying out a method of manufacturing a double-glazing panel with glazing gaskets of the present invention.

Reference numeral 1 denotes a support, reference numeral 2 denotes a double-glazing panel set upright in the vertical direction on the support 1, and reference numerals 5a and 5b denote molding dies disposed so as to sandwich a peripheral edge part of the double-glazing panel from both of a front side and a rear side.

The double-glazing panel 2 has a structure in which a space layer 4 is formed therein with a spacer 3 interposed between two glass sheets 2a and 2b. The spacer 3 is inserted into peripheral edge parts on four edges of the double-glazing panel 2 so as to surround the entire perimeter, thereby sealing the space layer 4. A structure of the spacer 3 is not particularly limited as long as the spacer 3 has a sealing function. In the example shown in FIG. 1, the spacer 3 is formed of a combination of primary sealing members 3a and a secondary sealing member 3b, which are made of an elastic material such as rubber, and a core member 3c made of a rigid material such as metal.

A support plate 6 having a number of guide rollers 6a is connected to the support 1, and is swingable by use of an actuator 7. A side surface of the double-glazing panel 2 on the support 1 is supported by the support plate 6 via the guide rollers 6a. The double-glazing panel 2 supported as described above can be inclined at an inclination angle, within a range from 0° to 45°, to the vertical direction, together with the support plate 6 that is inclined by the action of expansion and contraction of the actuator 7.

The front die 5a and the rear die 5b can be operated independently of each other at a front surface side (the right side in the drawing) and at a rear surface side (the left side in the drawing) while interposing the peripheral edge part of the double-glazing panel 2. Each of the front die 5a and the rear die 5b has a longitudinal cross section of an L-shape, and each of ejection ports 8a and 8b thereof lies across each of the surface sides and the end surface side of the double-glazing panel 2.

Moreover, the ejection port 8a having the longitudinal cross section of the L-shape is allowed to adhere closely to the front surface and the end surface of the double-glazing panel 2, while the ejection port 8b is allowed to adhere closely to the rear surface and the end surface of the double-glazing panel 2. For the purpose of carrying out the close adhesion, the front die 5a and the rear die 5b are respectively provided with air cylinders 9a and 9b in positions facing the front and rear surfaces of the double-glazing panel 2, and air cylinders 10a and 10b in positions facing the end surface side of the double-glazing panel 2.

Moreover, a flexible supply tube 11a is connected to the ejection port 8a of the front die 5a, and a flexible supply tube 11b is connected to the ejection port 8b of the rear die 5b. Furthermore, the supply tubes 11a and 11b are connected to supply cylinders 12a and 12b, respectively. The supply cylinders 12a and 12b are storages for temporarily storing a fused molding material, and are connected to an extruder 14 through a common valve 13.

By using the above-described device, the glazing gasket can be molded at the peripheral edge part of the double-glazing panel as follows.

First, the extruder 14 fuses the solid molding material, and then supplies the fused molding material M separately to the supply cylinders 12a and 12b through the valve 13. Thus, the molding material M is temporarily stored therein. Subsequently, the fused molding material M inside the supply cylinders 12a and 12b is supplied to the ejection port 8a of the front die 5a and the ejection port 8b of the rear die 5b respectively through the supply tubes 11a and 11b.

Figure 2:
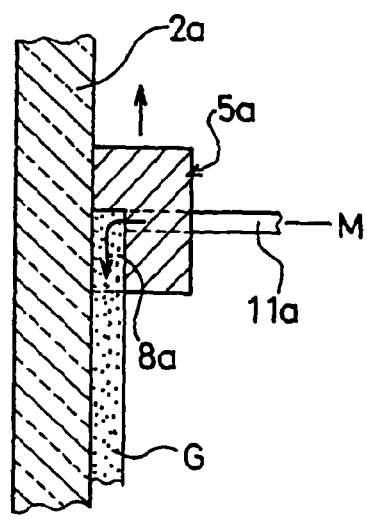
FIG. 2 is a schematic diagram showing a cross section of a portion of a molding die in the device of FIG. 1.
Figure 5:
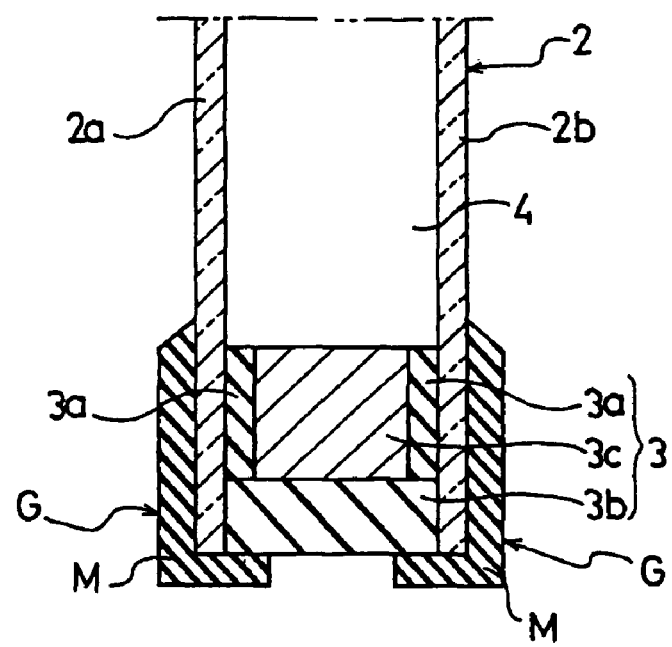
FIG. 5 is a longitudinal sectional view showing an essential part of a double-glazing panel with a glazing gasket manufactured by use of the device of FIG. 1.

In the meantime, the front die 5a and the rear die 5b are moved along the peripheral edge part of the double-glazing panel 2 at a constant speed, as shown in a transverse sectional view of FIG. 2 (note that FIG. 2 illustrates only the front die 5a), whereby the molding material M extruded from these ejection ports 8a and 8b is attached, and thus forms single-string glazing gaskets G and G along both sides of the peripheral edge part of the double-glazing panel 2. Specifically, the molding material M extruded from the former ejection port 8a forms the glazing gasket G on the front surface and the end surface of the double-glazing panel 2, while the molding material M extruded from the latter ejection port 8b forms the glazing gasket G on the rear surface and the end surface of the double-glazing panel 2. In this way, the double-glazing panel with the glazing gaskets is manufactured as shown in FIG. 5.

In the above-described device, the front die 5a and the rear die 5b are allowed to adhere closely to the front surface and the rear surface of the double-glazing panel 2 independently of each other. Thereby, the glazing gaskets G having the excellent dimensional accuracy are formed without causing a leakage of the molding material or a thickness deviation therein, even when there is an inclination in parallelism between the surfaces of the two glass sheets 2a and 2b. Moreover, since the front die 5a and the rear die 5b also adhere closely to the end surface of the double-glazing panel 2 independently of each other, the glazing gaskets G having the excellent dimensional accuracy can be formed without causing a leakage of the molding material or a thickness deviation therein, even when there is a difference in length between protruded portions of end surfaces of the two glass sheets 2a and 2b.

Moreover, the double-glazing panel 2 is set upright in the vertical direction, while the glazing gaskets G is being molded as described above. Thus, the gravity acts substantially evenly on the ejection ports 8a and 8b of the front die 5a and the rear die 5b. In this way, it is possible to mold the glazing gaskets G having no dimensional difference therebetween. As described previously, the posture of the double-glazing panel 2 in the vertical direction is set preferably within the range from 0° to 45°, or more preferably within the range from 0° to 15° to the vertical direction.

Meanwhile, as described previously, it is desirable to incline the double-glazing panel 2 to the non-operational side at an angle preferably within the range from 2° to 10° or more preferably in the range from 3° to 7° to the vertical direction. Here, in terms of the "non-operational side," the left side of the double-glazing panel 2 is equivalent to the non-operational side in the case of the device shown in FIG. 1. The right side is an operational side where an operator replaces the double-glazing panels, or the like.

Figure 3:
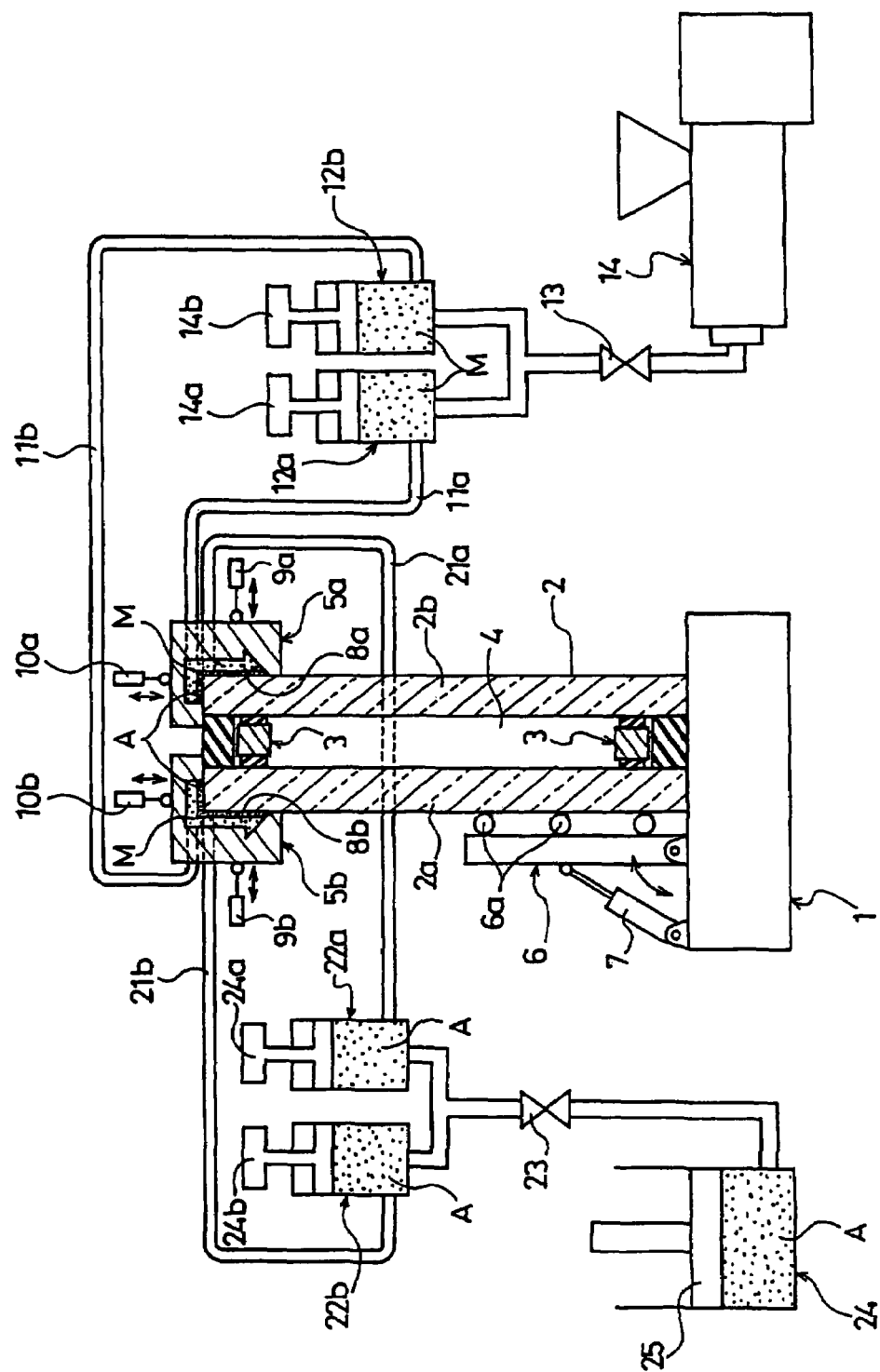
FIG. 3 is a schematic diagram showing a device of another embodiment for carrying out a method of manufacturing a double-glazing panel with a glazing gasket of the present invention.

FIG. 3 shows another device for carrying out the method of manufacturing a double-glazing panel with glazing gaskets of the present invention.

The device shown in FIG. 3 has a structure in which an adhesive coating mechanism is attached to the device shown in FIG. 1. The attached adhesive coating mechanism has the following structure.

In addition to the flexible supply tube 11a for supplying the molding material M, a flexible supply tube 21a for supplying an adhesive A is connected to the ejection port 8a of the front die 5a. Meanwhile, in addition to the flexible supply tube 11b for supplying the molding material M, a flexible supply tube 21b for supplying the adhesive A is connected to the ejection port 8b of the rear die 5b. Moreover, these supply tubes 21a and 21b for supplying the adhesive A are connected to supply cylinders 22a and 22b, respectively. The supply tubes 22a and 22b are places for temporarily storing the adhesive A, each of which is connected to a supply tank 24 storing a large amount of the adhesive A through a common valve 23 provided in one position.

A double-glazing panel with glazing gaskets containing the adhesive is manufactured by use of the above-described device as follows.

First, as similar to the case shown in FIG. 1, the molding material M is supplied to the ejection port 8a of the front die 5a and the ejection port 8b of the rear die 5b. On the other hand, the adhesive A is supplied from the supply tank 24 to the supply cylinders 22a and 22b by operating a plunger 25 and is temporarily stored therein. Next, the adhesive is supplied from the supply cylinders 22a and 22b respectively to the ejection port 8a of the front die 5a and the ejection port 8b of the rear die 5b through the supply tubes 21a and 21b by operating plungers 24a and 24b. Then, the adhesive A is ejected onto inner sides of the molding material M, and thus is layered thereon.

Figure 4:
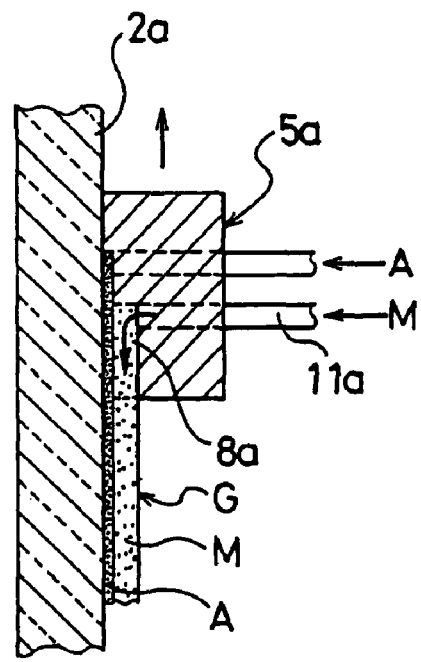
FIG. 4 is a schematic diagram showing a cross section of a portion of a molding die in the device of FIG. 3.
Figure 6:
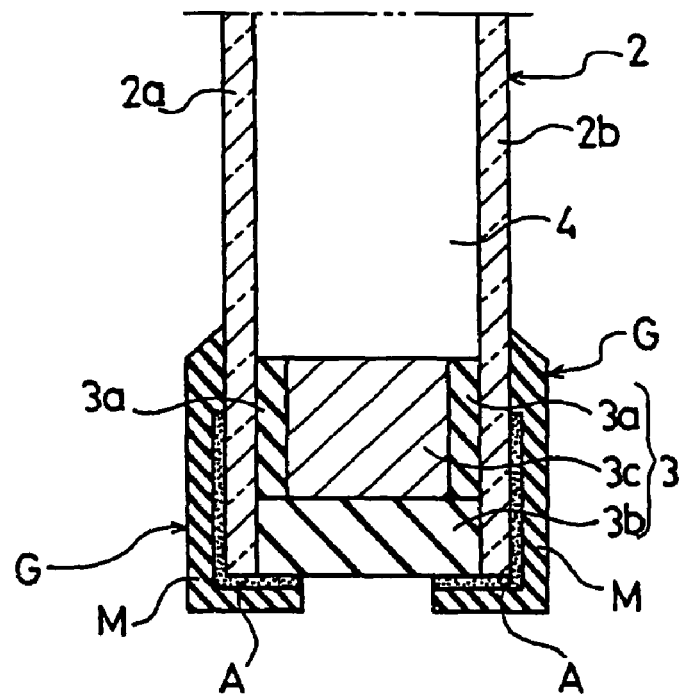
FIG. 6 is a longitudinal sectional view showing an essential part of a double-glazing panel with a glazing gasket manufactured by use of the device of FIG. 3.
Figure 7:
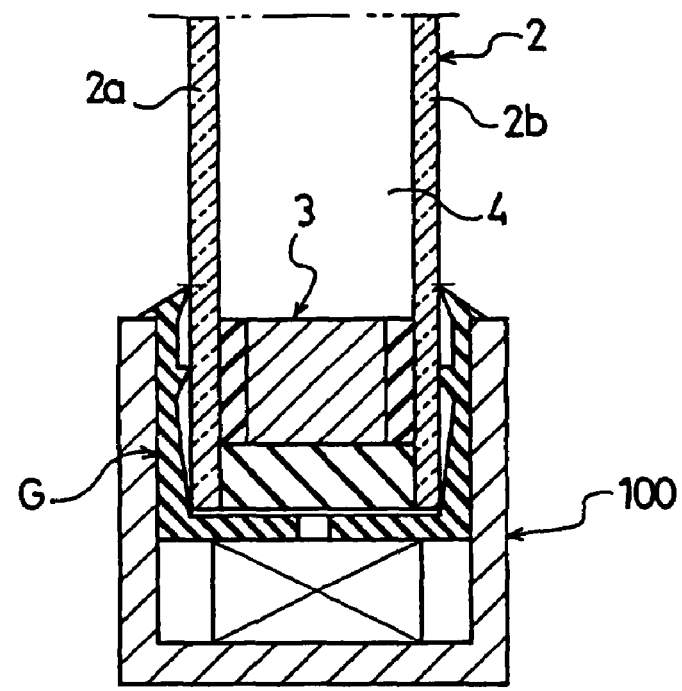
FIG. 7 is a longitudinal sectional view showing a portion of a conventional double-glazing panel with a glazing gasket installed in a sash.
Figure 8:
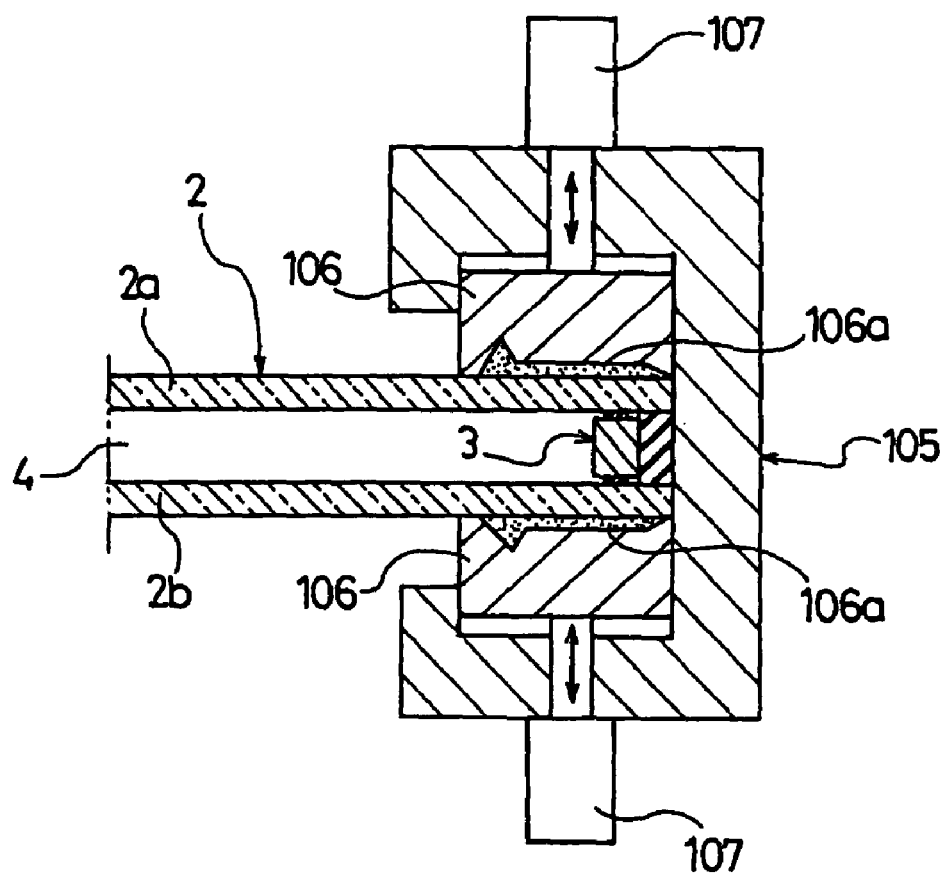
FIG. 8 is a longitudinal sectional view showing a conventional device for manufacturing a conventional double-glazing panel with a glazing gasket.

The molding material M and the adhesive A are united, forming stacked layers at both of the ejection port 8a of the front die 5a and the ejection port 8b of the rear die 5b. Then, the front die 5a and the rear die 5b are moved along the peripheral edge part of the double-glazing panel 2 at a predetermined speed, so that the adhesive A side of the stacked molding material M and adhesive A is bonded to the double-glazing panel 2, that is, the peripheral edge part of the double-glazing panel 2, as shown in a cross sectional view of FIG. 4 (note that FIG. 4 illustrates only the front die 5a). Thus, single-string glazing gaskets G are formed. In this way, it is possible to manufacture the double-glazing panel with the glazing gaskets having excellent peel resistance as shown in FIG. 6.

In this embodiment as well, the front die 5a and the rear die 5b are allowed to adhere closely to the double-glazing panel 2 independently of each other. Accordingly, the glazing gaskets G having the excellent dimensional accuracy can be molded without causing a leakage of the molding material M and the adhesive A or a thickness deviation therein. Moreover, by setting the double-glazing panel 2 upright in the vertical direction, it is possible to reduce a difference in the gravitational action on the glazing gaskets G and G on the front side and the rear side of the double-glazing panel 2.

The above-described embodiments show examples in which the glazing gaskets are molded, as glazing beads which are independent of each other on the front surface and the rear surface of a double-glazing panel. However, it is also possible to mold the glazing gaskets, as a glazing channel in which the glazing gaskets are in contact with each other, in a way that portions, which cover the end surface of the double-glazing panel, of the front die and the rear die are brought into contact with each other, and that the molding material ejected from the front die is merged with that from the rear die before or after the ejection.

What is claimed is:

1. A method of manufacturing a double-glazing panel with a glazing gasket, in which a glazing gasket is directly molded by extruding a molding material onto a peripheral edge part of the double-glazing panel which includes at least two glass sheets, and in which a space layer is formed between the adjacent glass sheets with a spacer interposed in between, said method comprising the steps of:

positioning a front die at the peripheral edge part of a front surface of the double-glazing panel and a rear die at the peripheral edge part of a rear surface of the double-glazing panel; and molding the glazing gaskets by allowing the front die to adhere closely to at least the front surface of the double-glazing panel, and by allowing the rear die to adhere closely to at least the rear surface of the double-glazing panel wherein the front die and the rear die are movable independently of each other in perpendicular and parallel directions relative to the front surface or the rear surface.

2. The method of manufacturing a double-glazing panel with a glazing gasket according to claim 1, wherein an ejection port of each of the front die and the rear die is formed with an L-shaped cross section so that each of the dies would cover the corresponding surface and an end surface of the double-glazing panel, and would adhere closely to the corresponding surface and the end surface of the double-glazing panel.

3. The method of manufacturing a double-glazing panel with a glazing gasket according to any one of claims 1 and 2, further comprising the steps of:

setting the double-glazing glass panel upright in a vertical direction; and molding the glazing gasket on the double-glazing panel.

4. The method of manufacturing a double-glazing panel with a glazing gasket according to claim 3, wherein the double-glazing panel is set upright at an angle, within a range of 0° to 45°, to the vertical direction.

5. The method of manufacturing a double-glazing panel with a glazing gasket according to claim 4, wherein the double-glazing panel is set upright, being inclined to a non-operational side of the double-glazing panel at an angle, within a range of 2° to 10°, to the vertical direction.

6. The method of manufacturing a double-glazing panel with a glazing gasket according to claim 1, further comprising the step of simultaneously extruding an adhesive onto sides facing the double-glazing panel of the molding material which are to be extruded from the front die and the rear die.

7. The method of manufacturing a double-glazing panel with a glazing gasket according to claim 1, wherein the molding material is thermoplastic elastomer.

8. The method of manufacturing a double-glazing panel with a glazing gasket according to claim 6, wherein the adhesive is a hot melt adhesive.

* * * * *